US012755111B2

(12) United States Patent
Lim

(10) Patent No.: US 12,755,111 B2
(45) Date of Patent: Oct. 6, 2026

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventor: Sungjun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 18/410,613

(22) Filed: Jan. 11, 2024

(65) Prior Publication Data

US 2024/0160860 A1 May 16, 2024

Related U.S. Application Data

(63) Continuation of application No. PCT/KR2023/018451, filed on Nov. 16, 2023.

(30) Foreign Application Priority Data

Nov. 16, 2022 (KR) ........................ 10-2022-0153958
Dec. 29, 2022 (KR) ........................ 10-2022-0189302

(51) Int. Cl.
*G06F 40/44* (2020.01)
*G06F 40/47* (2020.01)
*G06F 40/51* (2020.01)

(52) U.S. Cl.
CPC .............. *G06F 40/44* (2020.01); *G06F 40/47* (2020.01); *G06F 40/51* (2020.01)

(58) Field of Classification Search
CPC .......... G06F 40/44; G06F 40/47; G06F 40/51; G06F 18/214; G06F 40/263; G06F 40/30;
(Continued)

(56) References Cited

U.S. PATENT DOCUMENTS 10,509,864 B2 12/2019 Kang et al.
10,846,487 B2 11/2020 Lee
(Continued)

FOREIGN PATENT DOCUMENTS

EP 4 009 222 A1 6/2022
JP 5746921 B2 7/2015
(Continued)

OTHER PUBLICATIONS

International Search Report (PCT/ISA/210) issued Feb. 15, 2024 by the International Searching Authority in International Patent Application No. PCT/KR2023/018451.
(Continued)

*Primary Examiner* — Pierre Louis Desir
*Assistant Examiner* — Cody Douglas Hutcheson
(74) *Attorney, Agent, or Firm* — Sughrue Mion, PLLC

(57) ABSTRACT

An electronic device and a controlling method of the electronic device are disclosed. In particular, the electronic device according to the disclosure includes a communicator, a memory configured to store information on an encoder and learning data for learning of the encoder, and a processor configured to, based on acquiring information on an original text of a first language, input the information on the original text into the encoder, and acquire a first encoding vector indicating semantic information included in the original text, input the first encoding vector into a discriminator, and acquire a probability value indicating a probability that the first encoding vector would correspond to a normal translation, based on the probability value being greater than or equal to a predetermined first threshold value, control the communicator to transmit the first encoding vector to an external device including a decoder for acquiring a translation text of a second language corresponding to the original text, and based on the probability value being smaller than
(Continued)

the first threshold value, identify a second encoding vector having the highest similarity value indicating similarity to the first encoding vector among encoding vectors included in the learning data, and control the communicator to transmit the identified second encoding vector to the external device.

11 Claims, 8 Drawing Sheets

(58) Field of Classification Search
CPC ........ G06F 40/58; G06N 3/08; G06N 3/0455; G06N 3/047
See application file for complete search history.

(56) References Cited

U.S. PATENT DOCUMENTS

| | | | | |
|---|---|---|---|---|
| 11,227,129 | B2 | 1/2022 | Ahn et al. | |
| 11,270,079 | B2 | 3/2022 | Tu et al. | |
| 11,449,686 | B1 * | 9/2022 | Panchal | G06F 40/51 |
| 11,604,931 | B2 | 3/2023 | Yoon et al. | |
| 2017/0083510 | A1 * | 3/2017 | Dixon | G06F 40/44 |
| 2018/0011843 | A1 * | 1/2018 | Lee | G06F 40/58 |
| 2018/0218727 | A1 * | 8/2018 | Cutler | G10L 13/047 |
| 2019/0018842 | A1 | 1/2019 | Nomura et al. | |
| 2019/0163747 | A1 | 5/2019 | Kang et al. | |
| 2019/0213261 | A1 * | 7/2019 | Mochida | G06F 40/58 |
| 2019/0236147 | A1 | 8/2019 | Lee | |
| 2020/0320984 | A1 * | 10/2020 | Kuczmarski | G06N 20/00 |
| 2021/0097242 | A1 | 4/2021 | Yoon et al. | |
| 2021/0200963 | A1 * | 7/2021 | Zhang | G06F 40/45 |
| 2022/0067307 | A1 | 3/2022 | Rei et al. | |
| 2022/0215287 | A1 | 7/2022 | Klaiman et al. | |
| 2022/0327292 | A1 | 10/2022 | Costa-Jussa et al. | |
| 2023/0197059 | A1 | 6/2023 | Park et al. | |
| 2023/0274102 | A1 * | 8/2023 | Marie | G06F 40/44 704/2 |
| 2023/0351126 | A1 | 11/2023 | Park et al. | |
| 2024/0078264 | A1 * | 3/2024 | Solis | G06N 7/01 |
| 2024/0104311 | A1 * | 3/2024 | Park | G06F 40/58 |
| 2024/0311584 | A1 * | 9/2024 | Jiang | G06F 40/58 |
| 2025/0307574 | A1 * | 10/2025 | Hoang | G06F 40/51 |

FOREIGN PATENT DOCUMENTS

| | | | |
|---|---|---|---|
| JP | 6320732 | B2 | 5/2018 |
| JP | 6989975 | B2 | 1/2022 |
| KR | 10-2019-0091103 | A | 8/2019 |
| KR | 10-2019-0108297 | A | 9/2019 |
| KR | 10-2021-0037307 | A | 4/2021 |
| KR | 10-2022-0036099 | A | 3/2022 |
| KR | 10-2449842 | B1 | 9/2022 |
| KR | 10-2022-0142897 | A | 10/2022 |
| KR | 10-2454092 | B1 | 10/2022 |

OTHER PUBLICATIONS

Written Opinion (PCT/ISA/237) issued Feb. 15, 2024 by the International Searching Authority in International Patent Application No. PCT/KR2023/018451.

Kwon, Hong-Seok et al., "Enhancing Performance of Bilingual Lexicon Extraction through Refinement of Pivot-Context Vectors", Journel of the Korean Institute of Information Scientists and Engineers, vol. 41, Issue 7, pp. 492-500. (9 pages total).

Extended European Search Report issued Nov. 17, 2025 by the European Patent Office for EP Patent Application No. 23892038.3.

* cited by examiner

CONVENTIONAL TECHNOLOGY

ELECTRONIC DEVICE AND CONTROLLING METHOD OF ELECTRONIC DEVICE

CROSS-REFERENCE TO RELATED APPLICATIONS

This application is a by-pass continuation of International Application No. PCT/KR2023/018451, filed on Nov. 16, 2023, which is based on and claims priority to Korean Patent Application No. 10-2022-0153958 filed on Nov. 16, 2022, in the Korean Intellectual Property Office, and to Korean Patent Application No. 10-2022-0189302 filed on Dec. 29, 2022, in the Korean Intellectual Property Office. The disclosures of each of the foregoing applications are incorporated by reference herein in their entireties.

BACKGROUND

1. Field

The disclosure relates to an electronic device and a controlling method of the electronic device, and more particularly, to an electronic device that can acquire an encoding vector to be used in translation of a text, and a controlling method of the same.

2. Description of Related Art

Recently, as technologies related to artificial intelligence (AI) have been developed, development of technologies for translating an original text into a translation text by using an artificial intelligence model is being accelerated. In particular, a neural machine translation (NMT) technology is being performed by using a sequence to sequence (Seq2seq) model including an encoder for converting an original text into an encoding vector, and a decoder for converting the encoding vector into a translation text.

Meanwhile, in the case of translating an original text into two or more different languages by using a neural network model in particular, a normal translation text is acquired when translating the original text into any one language, but an error that an abnormal translation text is acquired may occur when translating the original text into the other one language.

In the case of the conventional technology for resolving such an error, a plurality of translation texts are acquired by translating an original text into two or more languages, and if an abnormal translation exists among the plurality of translation texts, a process of changing the abnormal translation text into a normal translation text based on the normal translation is performed.

That is, according to the conventional technology, translation texts are acquired first, and then a process for acquiring a normal translation text is performed afterwards, and thus an operation through a decoder should follow in an operation process, and accordingly, problems which are delay of the operation speed, and degradation of the efficiency in utilizing a hardware resource may be caused.

SUMMARY

The disclosure provides an electronic device that can improve both the efficiency of an operation and the quality of a translation text by using only an encoding vector acquired through an encoder without acquiring a translation text using a decoder, and a controlling method of the same.

According to an aspect of the disclosure, an electronic device includes: a communicator; at least one memory storing at least one instruction and learning data comprising a plurality of encoding vectors; and at least one processor configured to access the at least one memory and to execute the at least one instruction to: based on acquiring information on an original text of a first language, input the information on the original text into an encoder and acquire as an output of the encoder a first encoding vector comprising semantic information included in the original text, input the first encoding vector into a discriminator and acquire as an output of the discriminator a probability value indicating a probability that the first encoding vector corresponds to a normal translation, based on the probability value being greater than or equal to a predetermined first threshold value, control the communicator to transmit the first encoding vector to an external device comprising a decoder configured to acquire a translation text of a second language corresponding to the original text, and based on the probability value being smaller than the first threshold value, acquire a similarity value for each of the plurality of encoding vectors, wherein each similarity value indicates a degree of similarity between a respective encoding vector of the plurality of encoding vectors and the first encoding vector, identify a second encoding vector among the plurality of encoding vectors having the highest similarity value, and control the communicator to transmit the identified second encoding vector to the external device.

The encoder may include a first encoder and a second encoder, and the at least one processor may be further configured to execute the at least one instruction to: acquire as an output of the first encoder a third encoding vector comprising information for acquiring a translation text corresponding to the original text, and acquire as an output of the second encoder the first encoding vector further comprising semantic information included in the third encoding vector.

The at least one processor may be further configured to execute the at least one instruction to: based on the probability value being smaller than the first threshold value, acquire a second similarity value for each of the plurality of encoding vectors, wherein each second similarity value indicates a degree of similarity between a respective encoding vector of the plurality of encoding vectors and the third encoding vector, and identify a vector pair comprising the second encoding vector and a fourth encoding vector from among the plurality of encoding vectors, wherein the fourth encoding vector has the highest second similarity value.

The at least one processor may be further configured to execute the at least one instruction to: store the third encoding vector and the first encoding vector in the at least one memory as part of the learning data, and train the second encoder based on the learning data which includes the third encoding vector and the first encoding vector.

The at least one processor may be further configured to execute the at least one instruction to: acquire as an output of the encoder a third encoding vector comprising information for acquiring a translation text corresponding to the original text, control the communicator to transmit the third encoding vector to a server comprising an external encoder, and acquire the first encoding vector by receiving, from the external device through the communicator, an encoding vector acquired by the external encoder that comprises semantic information included in the third encoding vector.

The at least one processor may be further configured to execute the at least one instruction to: based on the probability value being smaller than the first threshold value and greater than or equal to a second threshold value smaller than the first threshold value, control the communicator to transmit the first encoding vector and the second encoding vector to the external device.

The at least one processor may be further configured to execute the at least one instruction to: receive, from the external device through the communicator, feedback information comprising a user's feedback for a translation text acquired by the external device based on the first encoding vector or the second encoding vector, and based on identifying the feedback information as being positive, store a pair of vectors including the first encoding vector or the second encoding vector in the at least one memory as part of the learning data.

The third encoding vector may include information on features of the first language and information on features of the second language, and the first encoding vector may include the semantic information and the information on the features of the second language.

According to an aspect of the disclosure, a method of controlling an electronic device includes: based on acquiring information on an original text of a first language, inputting the information on the original text into an encoder and acquiring as an output of the encoder a first encoding vector comprising semantic information included in the original text; inputting the first encoding vector into a discriminator and acquiring as an output of the discriminator a probability value indicating a probability that the first encoding vector corresponds to a normal translation; based on the probability value being greater than or equal to a predetermined first threshold value, transmitting the first encoding vector to an external device comprising a decoder configured to acquire a translation text of a second language corresponding to the original text; and based on the probability value being smaller than the first threshold value, acquiring a similarity value for each of the plurality of encoding vectors, wherein each similarity value indicates a degree of similarity between a respective encoding vector of the plurality of encoding vectors and the first encoding vector, identifying a second encoding vector among the plurality of encoding vectors having the highest similarity value, and transmitting the identified second encoding vector to the external device.

The encoder may include a first encoder and a second encoder, and wherein the method may further include: acquiring as an output of the first encoder a third encoding vector comprising information for acquiring a translation text corresponding to the original text, and acquiring as an output of the second encoder the first encoding vector further comprising semantic information included in the third encoding vector.

The method may further include: based on the probability value being smaller than the first threshold value, acquiring a second similarity value for each of the plurality of encoding vectors, wherein each second similarity value indicates a degree of similarity between a respective encoding vector of the plurality of encoding vectors and the third encoding vector, and identifying a vector pair comprising the second encoding vector and a fourth encoding vector from among the plurality of encoding vectors, wherein the fourth encoding vector has the highest second similarity value.

The method may further include: storing the third encoding vector and the first encoding vector in at least one memory of the electronic device as part of learning data; and training the second encoder based on the learning data which includes the third encoding vector and the first encoding vector.

The method may further include: acquiring as an output of the encoder a third encoding vector comprising information for acquiring a translation text corresponding to the original text, and the acquiring the first encoding vector may further include: transmitting the third encoding vector to a server comprising an external encoder; and acquiring the first encoding vector by receiving, from the external device, an encoding vector acquired by the external encoder that comprises semantic information included in the third encoding vector.

The method may further include: based on the probability value being smaller than the first threshold value and greater than or equal to a second threshold value smaller than the first threshold value, transmitting the first encoding vector and the second encoding vector to the external device.

The method may further include: receiving, from the external device, feedback information comprising a user's feedback for a translation text acquired by the external device based on the first encoding vector or the second encoding vector; and based on identifying the feedback information as being positive, storing a pair of vectors including the first encoding vector or the second encoding vector in at least one memory of the electronic device as learning data.

According to an aspect of the disclosure, a non-transitory computer readable medium having instructions stored therein, which when executed by at least one processor cause the at least one processor to execute a method of controlling an electronic device, wherein the method includes: based on acquiring information on an original text of a first language, inputting the information on the original text into an encoder and acquiring as an output of the encoder a first encoding vector comprising semantic information included in the original text; inputting the first encoding vector into a discriminator and acquiring as an output of the discriminator a probability value indicating a probability that the first encoding vector corresponds to a normal translation; based on the probability value being greater than or equal to a predetermined first threshold value, transmitting the first encoding vector to an external device comprising a decoder configured to acquire a translation text of a second language corresponding to the original text; and based on the probability value being smaller than the first threshold value, acquiring a similarity value for each of the plurality of encoding vectors, wherein each similarity value indicates a degree of similarity between a respective encoding vector of the plurality of encoding vectors and the first encoding vector, identifying a second encoding vector among the plurality of encoding vectors having the highest similarity value, and transmitting the identified second encoding vector to the external device.

The encoder may include a first encoder and a second encoder, and the method may further include: acquiring as an output of the first encoder a third encoding vector comprising information for acquiring a translation text corresponding to the original text, and acquiring as an output of the second encoder the first encoding vector further comprising semantic information included in the third encoding vector.

The method may further include: based on the probability value being smaller than the first threshold value, acquiring a second similarity value for each of the plurality of encoding vectors, wherein each second similarity value indicates a degree of similarity between a respective encoding vector of the plurality of encoding vectors and the third encoding vector, and identifying a vector pair comprising the second encoding vector and a fourth encoding vector from among the plurality of encoding vectors, wherein the fourth encoding vector has the highest second similarity value.

The method may further include: storing the third encoding vector and the first encoding vector in at least one memory of the electronic device as part of learning data; and training the second encoder based on the learning data which includes the third encoding vector and the first encoding vector.

The method may further include: acquiring as an output of the encoder a third encoding vector comprising information for acquiring a translation text corresponding to the original text, and the acquiring the first encoding vector may further include: transmitting the third encoding vector to a server comprising an external encoder; and acquiring the first encoding vector by receiving, from the external device, an encoding vector acquired by the external encoder that comprises semantic information included in the third encoding vector.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
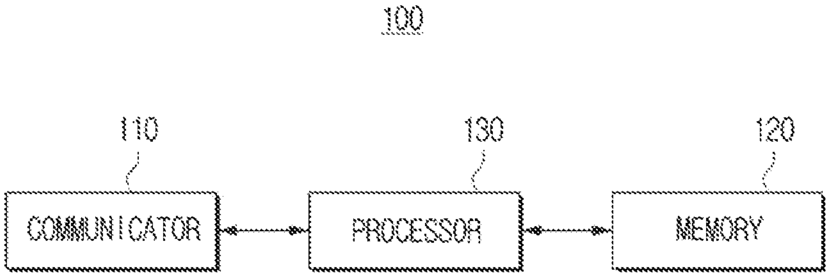
FIG. 1 is a block diagram illustrating a configuration of an electronic device according to one or more embodiments of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the one or more embodiments described herein are not intended to limit the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Also, in describing the disclosure, in case it is determined that detailed explanation of related known functions or features may unnecessarily confuse the gist of the disclosure, the detailed explanation may be omitted.

In addition, the embodiments described below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, the terms used in the disclosure are used only to explain specific embodiments, and are not intended to limit the scope of the disclosure. Also, singular expressions include plural expressions, unless defined obviously differently in the context.

In addition, in the disclosure, expressions such as "have," "may have," "include," and "may include" denote the existence of such characteristics (e.g.: elements such as numbers, functions, operations, and components), and do not exclude the existence of additional characteristics.

Further, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Also, the expressions "first," "second," and the like used in the disclosure may describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Further, in the embodiments of the disclosure, "a module" or "a part" may perform at least one function or operation, and may be implemented as hardware or software, or as a combination of hardware and software. Also, a plurality of "modules" or "parts" may be integrated into at least one module and implemented as at least one processor, excluding "a module" or "a part" that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, the embodiments according to the disclosure will be described in detail with reference to the accompanying drawings, such that those having ordinary skill in the art to which the disclosure belongs can easily carry out the disclosure.

Figure 2:
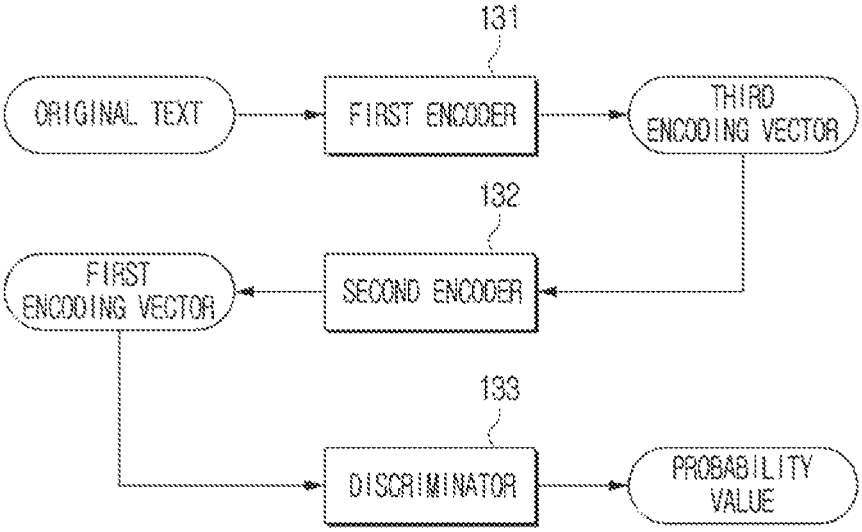
FIG. 2 is a diagram illustrating a plurality of modules and input/output data for each of the plurality of modules according to one or more embodiments of the disclosure.

FIG. 1 is a block diagram illustrating a configuration of an electronic device 100 according to one or more embodiments of the disclosure. Also, FIG. 2 is a diagram illustrating a plurality of modules and input/output data for each of the plurality of modules according to one or more embodiments of the disclosure.

"An electronic device 100" according to the disclosure refers to a device that can acquire an encoding vector to be used in translation of a text. For example, the electronic device 100 may be implemented as devices such as a smartphone, a tablet PC, a digital TV, etc., but there is no specific limitation on the types of the electronic device 100 according to the disclosure.

As illustrated in FIG. 1, the electronic device 100 according to one or more embodiments of the disclosure may include a communicator 110, a memory 120, and a processor 130. Also, the processor 130 may implement one or more embodiments according to the disclosure by using the plurality of modules as illustrated in FIG. 2.

The communicator 110 may include a circuit, and perform communication with an external device. Specifically, the processor 130 may receive various kinds of data or information from an external device connected through the communicator 110, and transmit various kinds of data or information to the external device through the communicator 110.

The communicator 110 may include at least one of a WiFi module, a Bluetooth module, a wireless communication module, an NFC module, or an ultra wide band (UWB) module. Specifically, a WiFi module and a Bluetooth module may perform communication by a WiFi method and a Bluetooth method, respectively. In the case of using a WiFi module or a Bluetooth module, various types of connection information such as an SSID is transmitted and received first, and connection of communication is performed by using the information, and various types of information can be transmitted and received thereafter.

Also, a wireless communication module may perform communication according to various communication standards such as IEEE, Zigbee, 3rd Generation (3G), 3rd Generation Partnership Project (3GPP), Long Term Evolution (LTE), 5th Generation (5G), etc. In addition, an NFC module may perform communication by a near field communication (NFC) method using the 13.56 MHz band among various RF-ID frequency bands such as 135 kHz, 13.56 MHz, 433 MHz, 860-960 MHz, and 2.45 GHz. Further, a UWB module can correctly measure a Time of Arrival (ToA) which is the time that a pulse takes to reach a target, and an Angle of Arrival (AoA) which is a pulse arrival angle in a transmission device through communication between UWB antennas, and accordingly, the UWB module can perform precise distance and location recognition in an error range of within scores of cm indoors.

In particular, according to one or more embodiments according to the disclosure, the processor 130 may control the communicator 110 to transmit to an external device an encoding vector that can be used in acquiring a translation text, and receive feedback information indicating a user's feedback for a translation text acquired by the external device from the external device through the communicator 110. Also, the processor 130 may receive information on an original text, information on a user voice corresponding to the original text, etc. through the communicator 110.

In the memory 120, at least one instruction regarding the electronic device 100 may be stored. Also, in the memory 120, an operating system (O/S) for driving the electronic device 100 may be stored. In addition, in the memory 120, various kinds of software programs or applications for the electronic device 100 to operate according to one or more embodiments of the disclosure may be stored. Further, the memory 120 may include a semiconductor memory such as a flash memory, etc., or a magnetic storage medium such as a hard disk, etc.

Specifically, in the memory 120, various kinds of software modules for the electronic device 100 to operate according to one or more embodiments of the disclosure may be stored, and the processor 130 may control the operations of the electronic device 100 by executing the various kinds of software modules stored in the memory 120. That is, the memory 120 may be accessed by the processor 130, and reading/recording/correction/deletion/update, etc. of data by the processor 130 may be performed.

As used herein, the term "memory 120" may include a ROM and a RAM inside the processor 130, or a memory card (e.g., a micro SD card, a memory stick) installed on the electronic device 100.

In particular, according to one or more embodiments according to the disclosure, in the memory 120, information on an encoder and learning data for learning of the encoder may be stored. The meaning of the encoder and the learning data according to the disclosure will be described later in the explanation regarding the processor 130. Other than the above, in the memory 120, various kinds of information or data such as information on an original text according to the disclosure, information on a translation text, information on a probability value, information on a similarity value, information on a plurality of modules according to the disclosure, etc. may be stored.

The processor 130 controls the overall operations of the electronic device 100. Specifically, the processor 130 may be connected with the components of the electronic device 100 including the communicator 110 and the memory 120, and may control the overall operations of the electronic device 100 by executing at least one instruction stored in the memory 120 as described above.

The processor 130 may be implemented in various methods. For example, the processor 130 may be implemented as at least one of an application specific integrated circuit (ASIC), an embedded processor, a microprocessor, a hardware control logic, a hardware finite state machine (FSM), or a digital signal processor (DSP). Meanwhile, in the disclosure, the term "processor 130" may be used as a meaning including a central processing unit (CPU), a graphic processing unit (GPU), and a micro processor unit (MPU), etc.

In particular, in one or more embodiments according to the disclosure, the processor 130 may acquire an encoding vector (or an embedding vector) for translating an original text by using the plurality of modules as illustrated in FIG. 2. According to an embodiment, the plurality of modules may be implemented as a software module or a hardware module, and at least some modules among the plurality of modules may be integrated as one module, or modules other than the modules as illustrated in FIG. 2 may be included in the plurality of modules. Also, the plurality of modules may include a neural network, and there is no special limitation on the types of the neural network included in the plurality of modules.

According to an embodiment, the encoders in the plurality of modules may include one or a plurality of encoders. Also, all of the plurality of encoders may be included in the electronic device 100, or at least some of the plurality of encoders may be included in a server (or an edge computing device), etc.

For example, in a case where the plurality of encoders include a first encoder 131 and a second encoder 132, and the first encoder 131 is included in the electronic device 100 and the second encoder 132 is included in a server, the processor 130 may control the communicator 110 to transmit an encoding vector acquired by the first encoder 131 (a third encoding vector as will be described below) to the server including the second encoder 132, and receive, from the server through the communicator 110, an encoding vector that is acquired by the second encoder 132 and indicates semantic information (a first encoding vector as will be described below).

Hereinafter, one or more embodiments of the disclosure will be described based on the premise of a case wherein the encoders according to the disclosure include the first encoder 131 and the second encoder 132, and both of the first encoder 131 and the second encoder 132 are included in the electronic device 100 and are implemented on-device.

The processor 130 may acquire information on an original text of a first language. Specifically, the processor 130 may acquire information on the original text based on a user's text input, or acquire information on the original text based on a user's voice utterance, or acquire information on the original text from an external device through the communicator 110.

When information on the original text is acquired, the processor 130 may input the information on the original text into an encoder, and acquire a first encoding vector indicating semantic information included in the original text. Here, "the first encoding vector" refers to an encoding vector including information indicating semantic information included in the original text, and in a case where the first encoding vector is acquired based on a third encoding vector after acquiring the third encoding vector as will be described below, the first encoding vector may refer to an encoding vector including information indicating semantic information included in the third encoding vector.

Specifically, the processor 130 may input the information on the original text into the first encoder 131, and acquire a third encoding vector including information for acquiring a translation text of a second language corresponding to the original text.

"The first encoder 131" refers to a module that converts the information on the original text into the third encoding vector. As illustrated in FIG. 2, when an original text is input, the first encoder 131 may acquire the third encoding vector by encoding the information in a text form into a vector form, and transmit the acquired third encoding vector to the second encoder 132.

"The third encoding vector" is used as a term for referring to an encoding vector including information for acquiring a translation text of the second language corresponding to the original text of the first language. For example, the third encoding vector may include information on the features of the first language which is the language of the original text, and information on the features of the second language which is a target language. In other words, the third encoding vector may mean an encoding vector having the features of the target language together with the features of the language of the original text.

When the third encoding vector is acquired, the processor 130 may input the third encoding vector into the second encoder 132, and acquire the first encoding vector indicating semantic information included in the third encoding vector.

"The second encoder 132" refers to a module that converts the third encoding vector into the first encoding vector. As illustrated in FIG. 2, when the third encoding vector is received from the first encoder 131, the second encoder 132 may acquire the first encoding vector by extracting the semantic information included in the third encoding vector, and transmit the acquired first encoding vector to a discriminator 133.

As described above, the first encoding vector refers to an encoding vector including the information indicating the semantic information included in the third encoding vector, and specifically, it may mean a vector encoded to further include semantic information that makes the original text rather than the information on the features of the first language used in multilingual translation. For example, the first encoding vector may further include semantic information that is common for various languages although it includes less information on the features of the first language compared to the third encoding vector, and it may include information on the features of the second language which is a target language together with the semantic information. Specifically which information is included by the encoding vectors according to the disclosure may vary according to the design of the encoders.

When the first encoding vector is acquired, the processor 130 may input the first encoding vector into the discriminator 133, and acquire a probability value indicating a probability that the first encoding vector would correspond to a normal translation.

"The discriminator 133" refers to a module that can identify whether the first encoding vector corresponds to a normal translation, and the term "discriminator 133" may be replaced by a term such as a classifier. As illustrated in FIG. 2, when the first encoding vector is received from the second encoder 132, the discriminator 133 may analyze distribution of the values included in the first encoding vector, and output a probability value indicating the probability that the distribution of the values included in the first encoding vector would correspond to a normal translation. Hereinafter, a probability value indicating a probability that the first encoding vector would correspond to a normal translation will be simply referred to as "a probability value for the first encoding vector."

In the disclosure, whether a translation is "a normal translation" or "an abnormal translation" may be determined based on the sentence structure of the translation and whether information that cannot be understood by the user is included in the translation, etc.

For example, in a case where an original text is a text which is "오늘 서로 나누었던 합의사항에 이의가 있으신가요", if the translation text is "Do you have any objections to the agreement we shared today?", the translation can be deemed as a normal translation according to the disclosure.

Meanwhile, in a case where the original text is the same as the example above, if the translation text is "Do you have any different opinions about agreement today?", it can be deemed as a case wherein the translation has a basic sentence structure even though it is a grammatically incorrect sentence, and information that cannot be understood by the user is not included, and thus the translation can be deemed as a normal translation according to the disclosure.

In contrast, in a case where the original text is the same as the example above, if the translation text of the second language is "das das das das das das das", it can be deemed as a case wherein the translation does not have a basic sentence structure, and information that cannot be understood by the user is included, and thus the translation can be deemed as an abnormal translation according to the disclosure.

The discriminator 133 according to the disclosure may mean a module for determining whether the first encoding vector corresponds to a normal translation as described above, or corresponds to an abnormal translation.

The discriminator 133 may be trained based on training data including a normal translation text (e.g., a text which is "Do you have any objections to the agreement we shared today?") and an abnormal translation text (e.g.: "das das das das das das das"). Specifically, if training data is input, the discriminator 133 may learn patterns of normal translation texts and error patterns of abnormal translation texts, and may thereby output a high probability value for a normal translation text, and output a low probability value for an abnormal translation text.

"Training data" includes normal translation texts, abnormal translation texts, and label information regarding whether each translation text indicates a normal translation text, and is distinguished from the learning data for the second encoder 132. In one or more embodiments, the label information included in the training data may be generated or changed based on a user feedback for a translation text as will be described below.

An abnormal translation may be acquired through a noise generation module that can acquire an abnormal translation by arbitrarily inserting "noise" into a normal translation or changing a part of the normal translation when a normal translation is input.

For example, in a case where the first encoding vector includes values such as [0.8750, 0.9364, 0.7917, 0.5445, . . . , 0.3862], the discriminator 133 may acquire a probability value which is 0.93 indicating the probability that the first encoding vector would correspond to a normal translation. In contrast, in case the first encoding vector includes distribution of repetitive values such as [0.8750, 0.8750, 0.8750, 0.8750, . . . , 0.8750], the discriminator 133 may acquire a probability value which is 0.14 indicating the probability that the first encoding vector would correspond to a normal translation.

When a probability value for the first encoding vector is acquired through the discriminator 133, the processor 130 may determine whether to transmit the first encoding vector to an external device, or to replace the first encoding vector with another encoding vector and transmit it based on the acquired probability value.

Here, "an external device" refers to a device that may, when an encoding vector is received from the electronic device 100, input the received encoding vector into a decoder included in the external device, and acquire a translation text corresponding to the original text. For example, the external device is a device used by the conversation counterpart of the user of the electronic device 100, and it may be implemented as a device such as a smartphone, a tablet PC, a digital TV, etc., and there is no special limitation on the types of the external device like the electronic device 100.

Specifically, if the probability value for the first encoding vector is greater than or equal to a first threshold value, the processor 130 may control the communicator 110 to transmit the first encoding vector to an external device including a decoder for acquiring a translation text corresponding to the original text. Here, the first threshold value may be changed according to the setting of the developer or the user.

In other words, if the probability value for the first encoding vector indicates that the probability that the first encoding vector would correspond to a normal translation is high, the processor 130 may transmit the first encoding vector to the external device, and accordingly, a normal translation text corresponding to the original text can be acquired by the external device.

Meanwhile, if the probability value for the first encoding vector is smaller than the first threshold value, the processor 130 may identify an encoding vector (a "second encoding vector") having the highest similarity value indicating similarity to the first encoding vector among encoding vectors included in the learning data, and control the communicator 110 to transmit the identified second encoding vector to the external device.

Specifically, the processor 130 may identify a vector pair having the highest similarity value indicating similarity to the second encoding vector and the first encoding vector among vector pairs included in the learning data. Then, the processor 130 may control the communicator 110 to transmit the second encoding vector corresponding to the first encoding vector among vectors included in the identified vector pair to the external device.

In other words, if the probability value for the first encoding vector indicates that the probability that the first encoding vector would correspond to a normal translation is low, the processor 130 may identify the second encoding vector that is similar to the first encoding vector and also has a high probability to correspond to a normal translation in the learning data, and transmit the identified second encoding vector to the external device instead of transmitting the first encoding vector to the external device. Then, accordingly, a normal translation text corresponding to the original text can be acquired by the external device.

According to an embodiment, various similarity calculation algorithms may be used to calculate similarity among the encoding vectors such as a cosine similarity calculation algorithm, a mean squared difference similarity calculation algorithm, a Pearson similarity calculation algorithm, etc. Also, an encoding vector that becomes a subject for comparison for similarity calculation may be determined differently depending on one or more embodiments as discussed below.

In an embodiment, the processor 130 may perform a process of calculating similarity between the encoding vectors included in the learning data and the first encoding vector as below. First, "the learning data" is data for learning of the second encoder 132, and it may include a plurality of vector pairs. As the encoding vectors included in the learning data are encoding vectors that can acquire a normal translation, the encoding vectors can not only be used in learning of the second encoder 132, but may also be used for replacing an encoding vector corresponding to an abnormal translation.

Specifically, each of the plurality of vector pairs included in the learning data may include an encoding vector which is an input of the second encoder 132, and an encoding vector which is a corresponding output. Hereinafter, for the convenience of explanation, an encoding vector which is an input of the second encoder 132 will be referred to as "a source encoding vector," and an encoding vector which is a corresponding output will be referred to as "a target encoding vector."

According to an embodiment, the processor 130 may calculate a first similarity value indicating similarity between the source encoding vectors of the vector pairs included in the learning data and the third encoding vectors. Then, the processor 130 may calculate a second similarity value indicating similarity between the target encoding vectors of the vector pairs included in the learning data and the first encoding vector.

When the first similarity value and the second similarity value for each of the vector pairs included in the learning data are calculated, the processor 130 may identify a vector pair having the highest average value of the first similarity value and the second similarity value among the vector pairs included in the learning data as a vector pair to be used in replacement of the first encoding vector.

In an embodiment, the processor 130 may calculate only one similarity value from among the first similarity value and the second similarity value, and identify a vector pair wherein the one similarity value is the highest among the vector pairs included in the learning data as a vector pair to be used in replacement of the first encoding vector.

In an embodiment, the processor 130 may also identify a vector pair to be used in replacement of the first encoding vector by using various methods, such as calculating a new third similarity value by concatenating the first similarity value and the second similarity value, and identifying a vector pair having the highest third similarity value.

In an embodiment, the processor 130 may determine whether to update the learning data based on the probability value for the first encoding vector. In an embodiment, if the probability value for the first encoding vector is greater than or equal to the first threshold value, it is a case indicating that the probability that the first encoding vector would correspond to a normal translation is high, and thus the processor 130 may store a pair of the third encoding vector and the first encoding vector in the memory 120 to be included in the learning data. In contrast, in a case where the probability value for the first encoding vector is smaller than the first threshold value, and it was determined that the first encoding vector would be replaced with the second encoding vector, the processor 130 may store a pair of the third encoding vector and the second encoding vector in the memory 120 to be included in the learning data.

In an embodiment, the processor 130 may determine whether to update the learning data based on a user's feedback for a translation text corresponding to the first encoding vector. In an embodiment, the processor 130 may receive, from the external device through the communicator 110, feedback information indicating a user's feedback for a translation text acquired by the external device based on the first encoding vector or the second encoding vector. Then, if the feedback information indicates that the user's feedback is positive, the processor 130 may store a pair of vectors including the first encoding vector or the second encoding vector in the memory 120 so as to be included in the learning data. A learning process according to the disclosure will be described in more detail with reference to FIG. 5 and FIG. 6.

In the above, an embodiment wherein the first encoding vector is transmitted to the external device in a case where the probability value for the first encoding vector is greater than or equal to the first threshold value, and in a case where the probability value for the first encoding vector is smaller than the first threshold value, the second encoding vector is transmitted to the external device instead of the first encoding vector was described. However, the disclosure is not limited to such an embodiment. For example, in a case where the probability value for the first encoding vector is smaller than the first threshold value, if the probability value is not very low, there is rather a possibility that a translation text of better quality would be acquired in a case of acquiring a translation text based on the first encoding vector than a case of acquiring a translation text based on the second encoding vector. Accordingly, the processor 130 may compare the probability value for the first encoding vector with a plurality of threshold values, and perform different operations for each section according to the plurality of threshold values.

According to an embodiment, if the probability value for the first encoding vector is smaller than the first threshold value and greater than or equal to the second threshold value smaller than the first threshold value, the processor 130 may control the communicator 110 to transmit the first encoding vector and the second encoding vector to the external device, for making the external device acquire translation texts corresponding to each of the first encoding vector and the second encoding vector. In other words, even if the probability value for the first encoding vector is smaller than the first threshold value, if the probability value is greater than the second threshold value, the processor 130 may transmit the first encoding vector and the second encoding vector to the external device to make two translation texts corresponding to each of the first encoding vector and the second encoding vector provided by the external device. The second threshold value may be changed according to the setting of the developer or the user.

In the above, one or more embodiments of the disclosure were described based on the premise of a case wherein both of the first encoder 131 and the second encoder 132 are included in the electronic device 100. However, at least one encoder from among the first encoder 131 and the second encoder 132 may be included in a server (or an edge computing device), etc.

Specifically, in a case where at least one encoder from among the first encoder 131 and the second encoder 132 is included in a server, if the first encoding vector corresponds to a normal translation text, the electronic device 100 may not transmit the first encoding vector to the server, but transmit it to the external device.

In contrast, if the first encoding vector corresponds to an abnormal translation text, the electronic device 100 may transmit the first encoding vector to a server including learning data. When the first encoding vector is received from the electronic device 100, the server may identify the second encoding vector having the highest similarity value indicating similarity to the first encoding vector among the encoding vectors included in the learning data, and transmit the identified second encoding vector to the electronic device 100. When the second encoding vector is received, the electronic device 100 may transmit the second encoding vector to the external device, and may thereby make a normal translation provided based on the second encoding vector.

In the above, a process of acquiring an encoding vector corresponding to an original text by using an encoder of the electronic device, and acquiring a translation text corresponding to the encoding vector by using a decoder of the external device was explained, but the electronic device can further include a decoder, and the external device can further include an encoder. That is, if a response text for an original text is input into the external device, the external device may acquire an encoding vector corresponding to the response text by using the encoder of the external device, and transmit the encoding vector to the electronic device, and the electronic device may acquire a translation text corresponding to the encoding vector by using the decoder of the electronic device.

Figure 3:
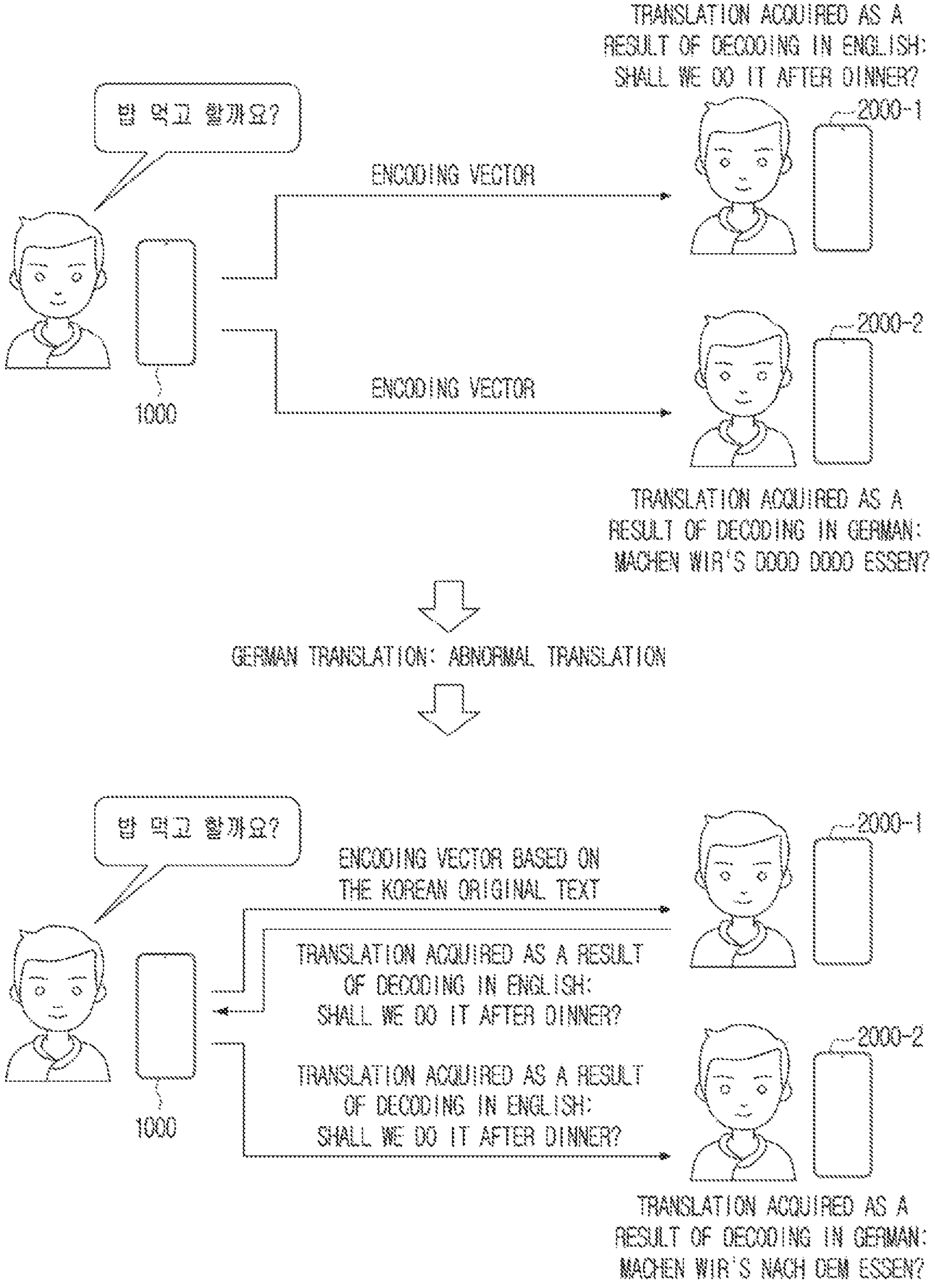
FIG. 3 is a diagram for illustrating a method for providing a normal translation according to a conventional technology.
Figure 4:
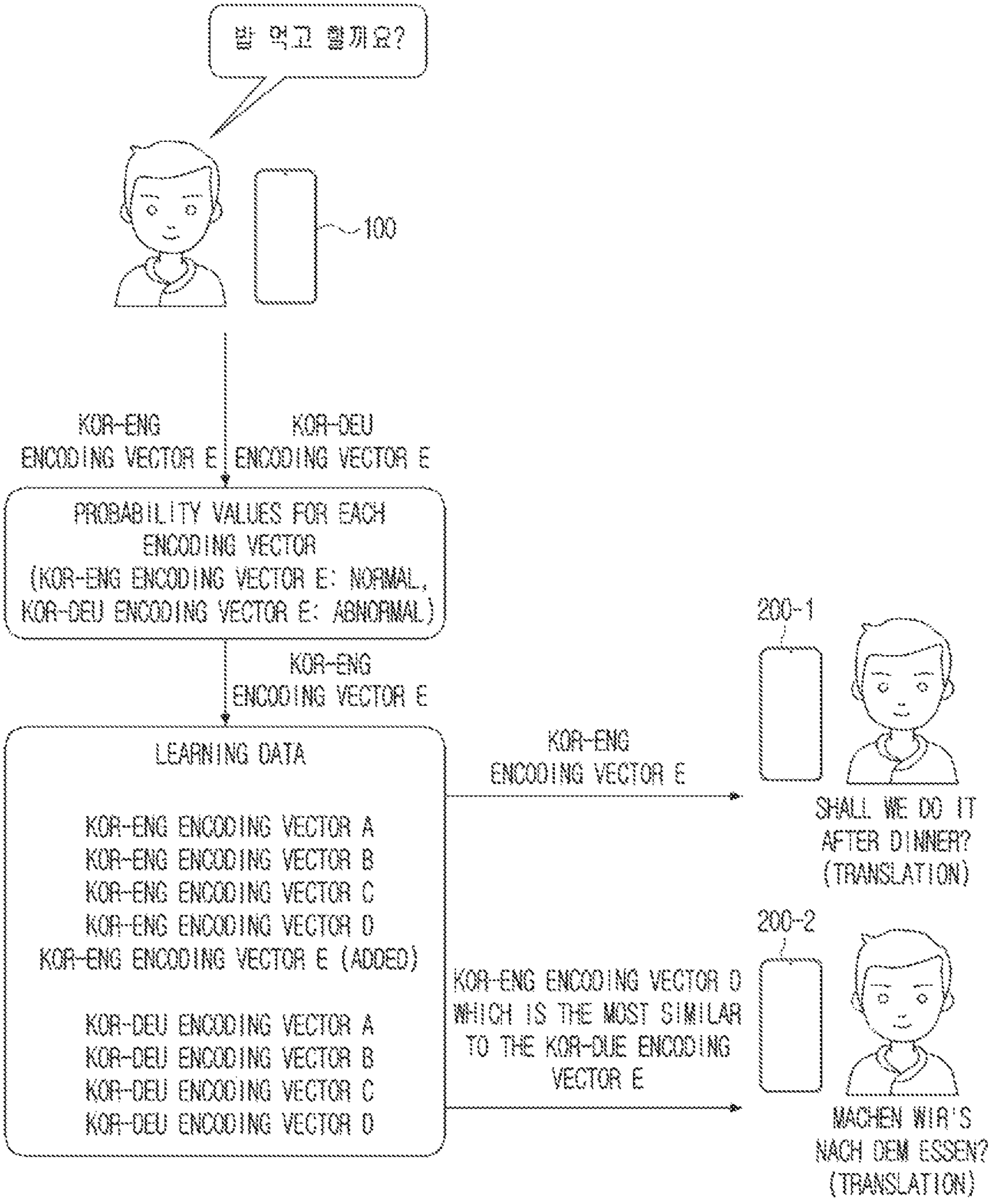
FIG. 4 is a diagram for illustrating a method for providing a normal translation according to one or more embodiments of the disclosure.

FIG. 3 is a diagram for illustrating a method for providing a normal translation according to a conventional technology, and FIG. 4 is a diagram for illustrating a method for providing a normal translation according to one or more embodiments of the disclosure.

Regarding FIG. 3 and FIG. 4, explanation will be described based on the premise of a case wherein a Korean text is input into the electronic device 1000 of a user, and the Korean text is respectively translated into English and German by a first external device 2000-1 of an English user and a second external device 2000-2 of a German user. For example, the situation in FIG. 3 and FIG. 4 may occur in a multilingual conference like an international conference.

As illustrated in FIG. 3, in the case of the conventional technology, in a case where a Korean text which is "밥 먹고 할까요?" is input, the electronic device 1000 may acquire an encoding vector corresponding to the Korean text, and transmit the encoding vector to the first external device 2000-1 and the second external device 2000-2. The first external device 2000-1 may decode the encoding vector, and acquire "Shall we do it after dinner?" which is an English translation, and the second external device 2000-2 may decode the encoding vector, and acquire "Machen wir's dddd dddd Essen?" which is a German translation. That is, in the embodiment in FIG. 3, the English translation is a normal translation, but the German translation includes a text like "dddd dddd," and thus it falls under an abnormal translation.

In this case, according to the conventional technology, the electronic device 1000 may receive information on "Shall we do it after dinner?" which is an English translation acquired by the first external device 2000-1 from the first external device 2000-1. Then, the electronic device 1000 may transmit the information on the English translation to the second external device 2000-2, and accordingly, the second external device 2000-2 may acquire "Machen wir's nach dem Essen?" which is a normal translation by translating the English translation into German.

In the case of the conventional technology, a plurality of translation texts are acquired by translating an original text into two or more languages, and if an abnormal translation exists among the plurality of translation texts, a process for changing the abnormal translation text into a normal translation text based on the normal translation is performed. That is, according to the conventional technology, translation texts are acquired first, and then a process for acquiring a normal translation text is performed afterwards, and thus an operation through a decoder should be performed in an operation process, and accordingly, problems which are delay of the operation speed, and degradation of the efficiency in utilizing a hardware resource may be caused. Also, as a translation text is used, there is a limitation that, although syntactic analysis is possible, semantic analysis is difficult.

Referring to FIG. 4, in the case of the disclosure, if a Korean text which is "밥 먹고 할까요?" is input, the electronic device 100 may acquire an encoding vector corresponding to the Korean text. Specifically, the electronic device 100 may input the Korean text into the first encoder 131, and acquire a third encoding vector including information on the features of Korean and the features of the target language, and input the third encoding vector into the second encoder 132, and acquire the first encoding vector including semantic information that makes the Korean text more useful for multilingual translation.

Here, as the first encoding vector is also acquired based on the third encoding vector, the first encoding vector may include the information on the features of Korean and the information on the features of the target language. Accordingly, in FIG. 4, the encoding vector including the information on the features of Korean and the information on the features of English was indicated as "a Kor-Eng encoding vector," and the encoding vector including the information on the features of Korean and the information on the features of German was indicated as "a Kor-Deu encoding vector." Meanwhile, the reference numerals A to E are for distinguishing different encoding vectors.

As illustrated in FIG. 4, when the Kor-Eng encoding vector E and the Kor-Deu encoding vector E are acquired, the electronic device 100 may input the Kor-Eng encoding vector E and the Kor-Deu encoding vector E into the discriminator 133, and acquire probability values for each encoding vector. Then, based on whether the acquired probability values are greater than or equal to a predetermined threshold value, the electronic device 100 may identify whether the probability that the encoding vectors would correspond to a normal translation is high, or the probability that the encoding vectors would correspond to an abnormal translation is high.

As a result of identification, in case the probability that the Kor-Eng encoding vector E would correspond to a normal translation is high, as in the example of FIG. 4, the electronic device 100 may transmit the Kor-Eng encoding vector E to the first external device 200-1, and accordingly, the first external device 200-1 may decode the Kor-Eng encoding vector E, and acquire "Shall we do it after dinner?" which is a normal English translation.

In contrast, in case the probability that the Kor-Deu encoding vector E would correspond to an abnormal translation is high, the electronic device 100 may identify the Kor-Eng encoding vector D which is the most similar to the Kor-Deu encoding vector E among the encoding vectors included in the learning data, and transmit the identified Kor-Eng encoding vector D to the second external device 200-2. Accordingly, the second external device 200-2 may decode the Kor-Eng encoding vector D, and acquire "Machen wir's nach dem Essen?" which is a normal translation.

According to the embodiments of the disclosure described above, the electronic device 100 can improve both the efficiency of an operation and the quality of a translation text by using only an encoding vector acquired through an encoder without acquiring a translation text using a decoder.

Specifically, the electronic device 100 can noticeably improve the operation speed and the efficiency in utilizing a hardware resource by using only an encoding vector acquired through an encoder in acquiring a translation text, without an operation through a decoder.

Also, according to the disclosure, in a case where the probability that an encoding vector acquired through an encoder would correspond to an abnormal translation is high, an encoding vector similar to the encoding vector having a high probability to correspond to an abnormal translation among the encoding vectors stored in the learning data is used in acquiring a translation, and accordingly, the quality of a translation text can be improved.

In addition, according to the disclosure, whether a translation is normal is identified based on an encoding vector that can include information on more attributes than a text itself without using a translation text, and thus there is an advantage that semantic analysis that goes beyond syntactic analysis is possible.

Further, according to an embodiment, in a case where it is identified that an encoding vector acquired through an encoder corresponds to a normal translation, a vector pair including the encoding vector is stored as learning data, and the encoder is retrained based on it, and accordingly, the quality of a translation text can be further improved. Regarding learning of an encoder, detailed explanation will be described with reference to FIG. 5 and FIG. 6 below.

Figure 5:
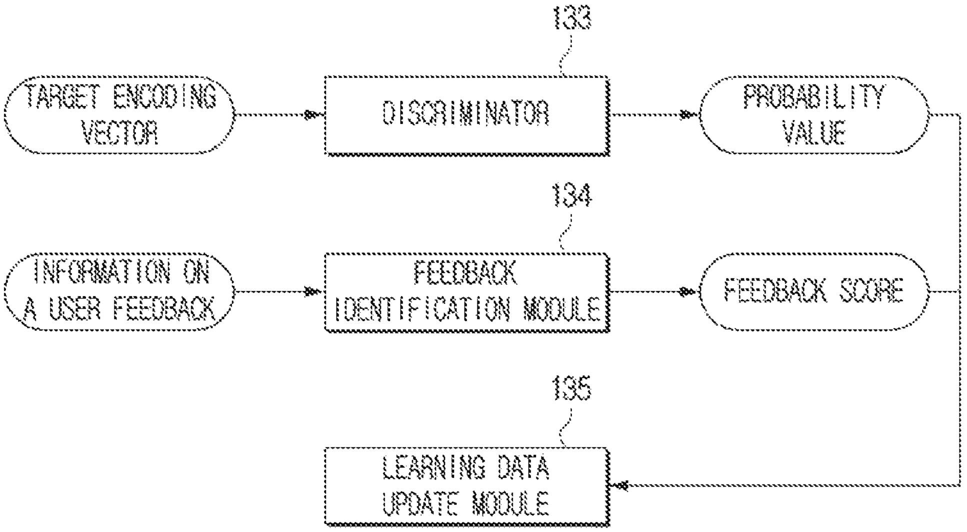
FIG. 5 is a block diagram illustrating a plurality of modules for performing an update process of learning data according to one or more embodiments of the disclosure.
Figure 6:
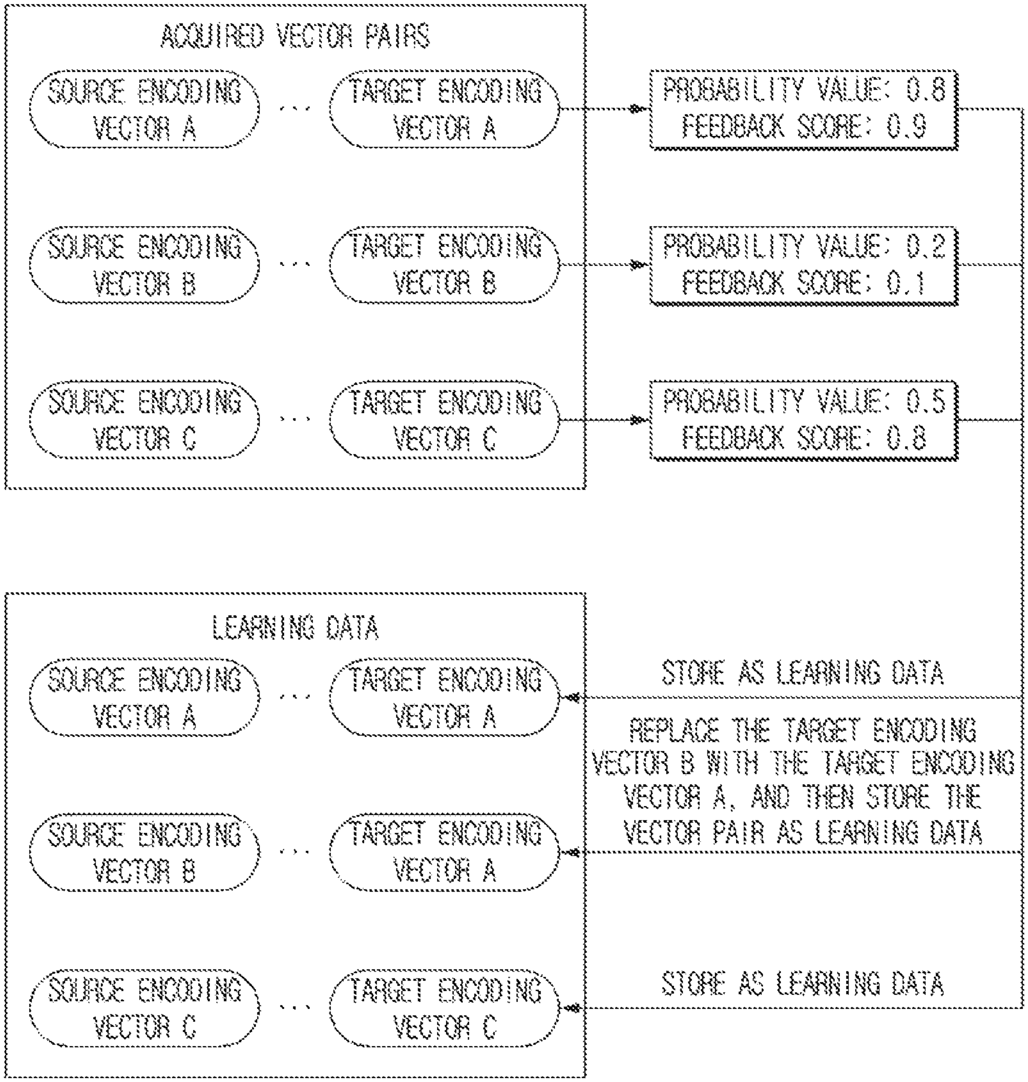
FIG. 6 is a diagram illustrating a configuration of learning data that is updated according to one or more embodiments of the disclosure.

FIG. 5 is a block diagram illustrating a plurality of modules for performing an update process of learning data according to one or more embodiments of the disclosure, and FIG. 6 is a diagram illustrating a configuration of learning data that is updated according to one or more embodiments of the disclosure.

The processor 130 may perform a learning process according to the disclosure by using the plurality of modules as illustrated in FIG. 5. Specifically, the plurality of modules according to the disclosure may include a discriminator 133, a feedback identification module 134, and a learning data update module 135.

As described above, "a source encoding vector" is a term for referring to an encoding vector which is an input of the second encoder 132, and "a target encoding vector" is used as a term for referring to an encoding vector which is an output of the second encoder 132.

When a pair of a source encoding vector and a target encoding vector is acquired, the processor 130 may store the pair of the source encoding vector and the target encoding vector in the memory 120. Then, the processor 130 may identify whether it is a case wherein the target encoding vector corresponds to a normal translation, and determine whether to store the pair of the source encoding vector and the target encoding vector in the memory 120 as learning data according to the identification result.

Here, the process of identifying whether it is a case wherein the target encoding vector corresponds to a normal translation may be performed by using at least one of the discriminator 133 and the feedback identification module 134.

As illustrated in FIG. 5, the processor 130 may input a target encoding vector into the discriminator 133, and acquire a probability value indicating the probability that the target encoding vector would correspond to a normal translation. Then, the discriminator 133 may transmit the acquired probability value to the learning data update module 135. As described above, the discriminator 133 refers to a module that can determine whether a target encoding vector corresponds to a normal translation, and it may analyze distribution of the values included in the target encoding vector, and output a probability value indicating how much the probability that the distribution of the values included in the target encoding vector would correspond to a normal translation is.

In an embodiment, the processor 130 may transmit the target encoding vector to the external device, and receive information on the user's feedback from the external device. Specifically, the external device may acquire a translation text corresponding to the target encoding vector by decoding the target encoding vector by using the decoder included in the external device. The external device may provide the acquired translation text to the user of the external device and receive a user feedback from the user.

When information on the user feedback is received from the external device through the communicator 110, the processor 130 may input the information on the user feedback into the feedback identification module 134 and acquire a feedback score. Then, the feedback identification module 134 may transmit the acquired feedback score to the learning module. That is, the feedback identification module 134 refers to a module that quantifies information on a user feedback and calculates a feedback score. A feedback score may be calculated based on a predefined rule for quantifying information on a user feedback.

Specifically, information on a user feedback may include information indicating a positive feedback or a negative feedback of the user for a translation text. Not only that, information on a user feedback may include information on quantitative evaluation of the user for a translation text. For example, information on a user feedback may include information indicating that the user selected a UI icon which is "Like it" for a translation text, information indicating that the user selected a UI icon for granting "three stars" for a translation text, etc.

When the probability value is received from the discriminator 133, and the feedback score is received from the feedback identification module 134, the learning data update module 135 may determine whether to store the pair of the target encoding vector and the corresponding source encoding vector as learning data based on at least one of the probability value or the feedback score. That is, the learning data update module 135 refers to a module that determines whether to update the learning data by storing a vector pair including a target encoding vector as learning data.

In one or more embodiments, the processor 130 may determine whether to store a vector pair including a target encoding vector as learning data based on at least one of whether the probability value corresponding to the target encoding vector is greater than or equal to a predetermined threshold value A, or whether the feedback score corresponding to the user feedback is greater than or equal to a predetermined threshold value B.

As an example, hereinafter, an embodiment of storing a vector pair including a target encoding vector as learning data in case the threshold value A for a probability value is 0.7 and the threshold value B for a feedback score is also 0.7, and the probability value corresponding to the target encoding vector is greater than or equal to the predetermined threshold value A, or the feedback score corresponding to the user feedback is greater than or equal to the predetermined threshold value B.

As illustrated in FIG. 6, in a case where the probability value for the target encoding vector A is 0.8 and the feedback score is 0.9, the learning data update module 135 may store a vector pair including the source encoding vector A and the target encoding vector A as learning data, as the probability value for the target encoding vector A is greater than or equal to the threshold value A, and the feedback score corresponding to the user feedback is greater than or equal to the predetermined threshold value B.

Meanwhile, as illustrated in FIG. 6, in a case where the probability value for the target encoding vector B is 0.2 and the feedback score is 0.1, the learning data update module 135 may not store a vector pair including the source encoding vector B and the target encoding vector B as learning data, as the probability value for the target encoding vector B is smaller than the threshold value A, and the feedback score corresponding to the user feedback is also smaller than the threshold value B. Instead, the learning data update module 135 may replace the target encoding vector B with the target encoding vector A which is the most similar to the target encoding vector B, and then store the vector pair as learning data. As the process of replacing a target encoding vector with the most similar vector was described above, overlapping explanation regarding the same content will be omitted.

As illustrated in FIG. 6, in a case where the probability value for the target encoding vector C is 0.5 and the feedback score is 0.8, the learning data update module 135 may store a vector pair including the source encoding vector C and the target encoding vector C as learning data, as the feedback score corresponding to the user feedback is greater than or equal to the threshold value B, although the probability value for the target encoding vector C is smaller than the threshold value A.

In an embodiment, the learning data update module 135 may also determine whether to store a vector pair including a target encoding vector as learning data, based on whether the sum of the probability value corresponding to the target encoding vector and the feedback score corresponding to the user feedback is greater than or equal to the threshold value C.

When the learning data is updated as described above, the processor 130 may retrain the second encoder 132 based on the updated learning data. In other words, a vector pair which was identified to be able to be used in acquiring a normal translation may be used in learning of the second encoder 132 like the pre-stored vector pairs in the memory 120 as learning data, and accordingly, the second encoder 132 may be fine-tuned.

Learning for the second encoder 132 may be performed according to a supervised learning method of using a source encoding vector included in the learning data as an input and using a corresponding target encoding vector as a label, but is not limited thereto. Also, for losses used in learning for the second encoder 132, various losses such as an L1 loss, an L2 loss, and a cross entropy loss, etc. may be used.

Meanwhile, as encoding vectors used in retraining are encoding vectors that can acquire a normal translation, they may not only be used in learning of the second encoder 132, but may also be used for replacing an encoding vector corresponding to an abnormal translation.

Figure 7:
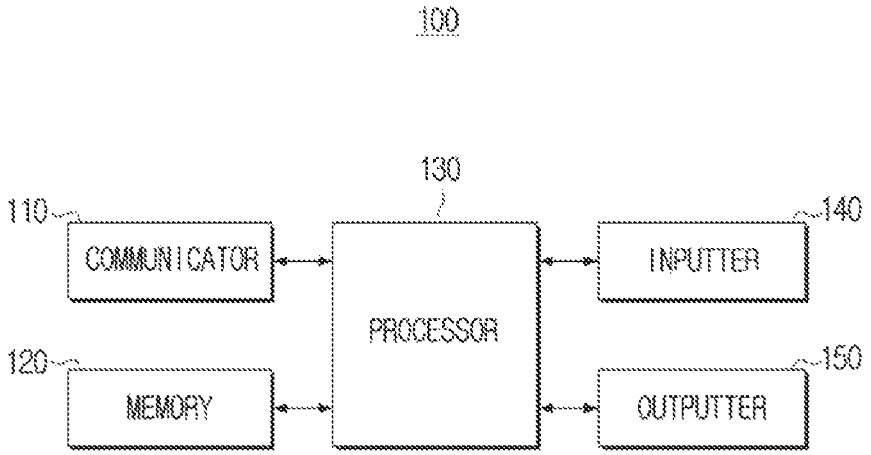
FIG. 7 is a block diagram illustrating in detail a configuration of an electronic device according to one or more embodiments of the disclosure.

FIG. 7 is a block diagram illustrating in detail a configuration of the electronic device 100 according to one or more embodiments of the disclosure.

As illustrated in FIG. 7, the electronic device 100 may not only include a communicator 110, a memory 120, and a processor 130, but may also further include an inputter 140 and an outputter 150. However, the components as illustrated in FIG. 1 and FIG. 7 are merely exemplary ones, and in implementing the disclosure, new components can be added in addition to the components as illustrated in FIG. 1 and FIG. 7, or some components can be omitted.

The inputter 140 includes a circuit, and the processor 130 may receive a user instruction for controlling the operations of the electronic device 100 through the inputter 140. Specifically, the inputter 140 may consist of components such as a microphone, a camera, a remote control signal receiver, etc. Also, the inputter 140 may be implemented in a form of being included in the display as a touch screen. In particular, the microphone may acquire a signal for a sound or a voice generated outside the electronic device 100. Specifically, the microphone may acquire vibration according to a sound or a voice generated outside the electronic device 100, and convert the acquired vibration into an electronic signal.

In particular, the microphone according to an embodiment may acquire a voice signal for a user voice generated by the user's utterance. Then, the acquired signal may be converted into a signal in a digital form, and stored in the memory 120. The microphone may include an analog to digital (A/D) converter, and it may also operate by being interlocked with an A/D converter located outside the microphone.

In particular, in one or more embodiments according to the disclosure, the processor 130 may receive information on an original text according to the disclosure through the inputter 140. Not only that, the processor 130 may receive a user voice corresponding to information on an original text through the microphone. When a user voice is received through the microphone, the processor 130 may input the received user voice into a trained voice recognition model (e.g., an automatic speech recognition (ASR) model), and acquire information on a text corresponding to the user voice as information on the original text. Also, the processor 130 may receive various user inputs such as a user input for transmitting the first encoding vector to the external device through the inputter 140, etc.

The outputter 150 includes a circuit, and the processor 130 may output various functions that the electronic device 100 can perform through the outputter 150. Also, the outputter 150 may include at least one of a display, a speaker, or an indicator.

The display may output image data by control by the processor 130. Specifically, the display may output a pre-stored image in the memory 120 by control by the processor 130. In particular, the display according to one or more embodiments of the disclosure may display a user interface stored in the memory 120. The display may be implemented as a liquid crystal display (LCD) panel, organic light emitting diodes (OLED), etc., and the display may also be implemented as a flexible display, a transparent display, etc. depending on cases. However, the display according to the disclosure is not limited to a specific type. The speaker may output audio data by control by the processor 130, and the indicator may be turned on by control by the processor 130.

In particular, in one or more embodiments according to the disclosure, in a case where it is identified that the probability that the first encoding vector would correspond to an abnormal translation is high, the processor 130 may control the outputter 150 to output various messages such as a message indicating that the probability that the first encoding vector would correspond to an abnormal translation is high, a message indicating that the first encoding vector was replaced with the second encoding vector, a message indicating how a feedback of the user of the external device for a translation is, etc.

Figure 8:
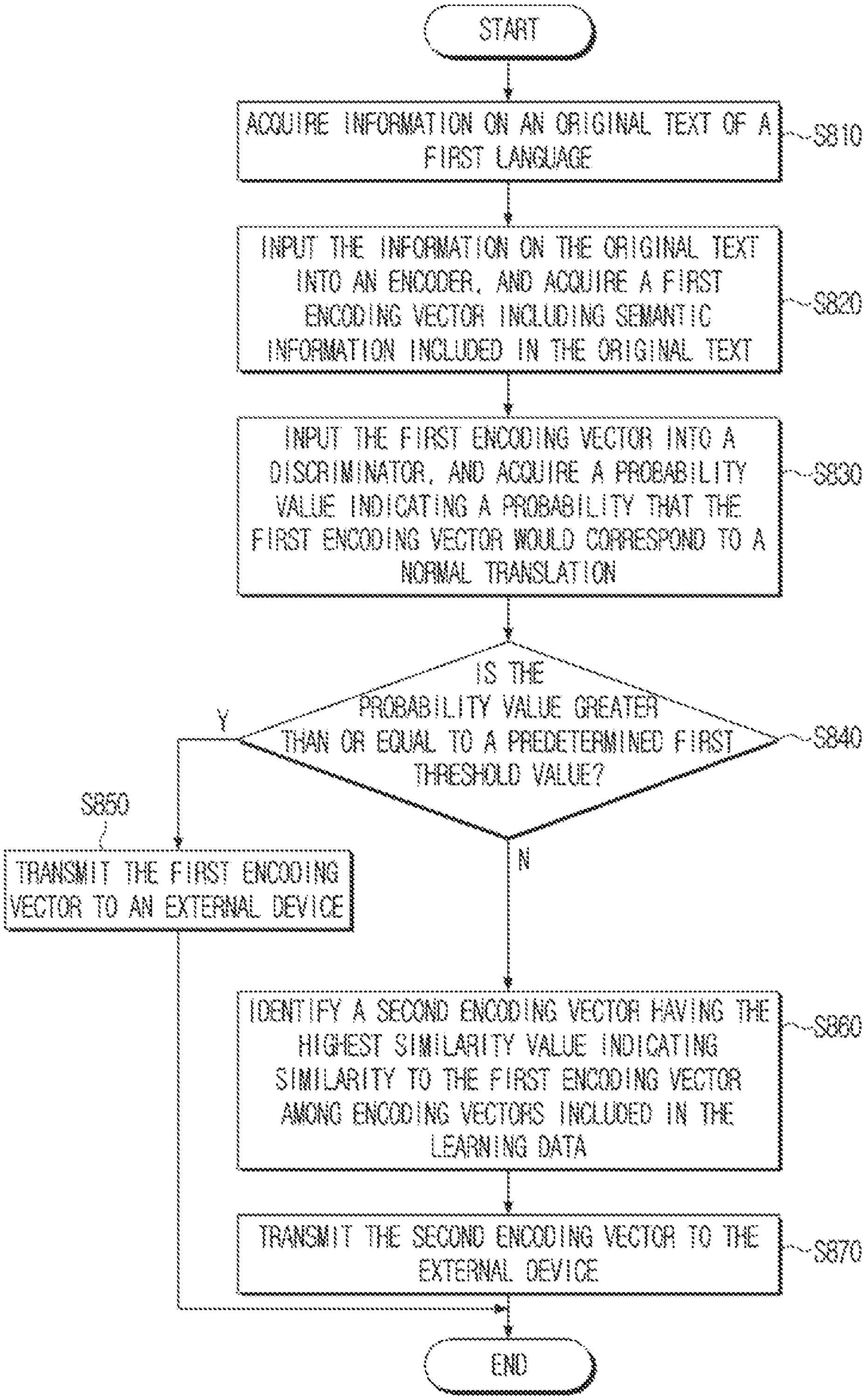
FIG. 8 is a flow chart illustrating a method of controlling an electronic device according to one or more embodiments of the disclosure.

FIG. 8 is a flow chart illustrating a method of controlling the electronic device 100 according to one or more embodiments of the disclosure.

As illustrated in FIG. 8, the electronic device 100 may acquire information on an original text of a first language in operation S810. Specifically, the electronic device 100 may acquire information on an original text based on a user's text input, or acquire information on an original text based on a user's voice utterance, or acquire information on an original text by receiving information on the original text from an external device.

When the information on the original text is acquired, the electronic device 100 may input the information on the original text into an encoder, and acquire a first encoding vector indicating semantic information included in the original text in operation S820.

Specifically, the electronic device 100 may input the information on the original text into a first encoder 131, and acquire a third encoding vector including information for acquiring a translation text of a second language corresponding to the original text. When the third encoding vector is acquired, the electronic device 100 may input the third encoding vector into a second encoder 132, and acquire the first encoding vector indicating semantic information included in the third encoding vector.

When the first encoding vector is acquired, the electronic device 100 may input the first encoding vector into a discriminator 133, and acquire a probability value indicating a probability that the first encoding vector would correspond to a normal translation in operation S830.

When the probability value for the first encoding vector is acquired through the discriminator 133, the electronic device 100 may identify whether the acquired probability value is greater than or equal to a predetermined first threshold value in operation S840. Then, the electronic device 100 may determine whether to transmit the first encoding vector to the external device, or to replace the first encoding vector with another encoding vector and transmit it according to the identification result.

Specifically, if the probability value for the first encoding vector is greater than or equal to the first threshold value, the electronic device 100 may transmit the first encoding vector to the external device including a decoder for acquiring a translation text corresponding to the original text in operation S850.

In other words, if the probability value for the first encoding vector indicates that the probability that the first encoding vector would correspond to a normal translation is high, the electronic device 100 may transmit the first encoding vector to the external device, and accordingly, a normal translation text corresponding to the original text can be acquired by the external device.

Meanwhile, if the probability value for the first encoding vector is smaller than the first threshold value, the electronic device 100 may identify an encoding vector having the highest similarity value indicating similarity to the first encoding vector among encoding vectors included in the learning data in operation S860, and transmit the identified second encoding vector to the external device in operation S870.

Specifically, the electronic device 100 may identify a vector pair having the highest similarity value indicating similarity to the second encoding vector and the first encoding vector among vector pairs included in the learning data. Then, the electronic device 100 may control the communicator 110 to transmit the second encoding vector corresponding to the first encoding vector among vectors included in the identified vector pair to the external device.

In other words, if the probability value for the first encoding vector indicates that the probability that the first encoding vector would correspond to a normal translation is low, the electronic device 100 may identify the second encoding vector that is similar to the first encoding vector and also has a high probability to correspond to a normal translation in the learning data, and transmit the identified second encoding vector to the external device, instead of transmitting the first encoding vector to the external device. Then, accordingly, a normal translation text corresponding to the original text can be acquired by the external device.

The method of controlling the electronic device 100 according to the aforementioned embodiments may be implemented as a program, and provided to the electronic device 100. In particular, a program including the method of controlling the electronic device 100 may be provided while being stored in a non-transitory computer readable medium.

Specifically, in a non-transitory computer readable medium including a program executing the method of controlling the electronic device 100, the method of controlling the electronic device 100 includes the operations of, based on acquiring information on an original text of a first language, inputting the information on the original text into the encoder, and acquiring a first encoding vector indicating semantic information included in the original text, inputting the first encoding vector into the discriminator 133, and acquiring a probability value indicating a probability that the first encoding vector would correspond to a normal translation, based on the probability value being greater than or equal to a predetermined first threshold value, transmitting the first encoding vector to an external device including a decoder for acquiring a translation text of a second language corresponding to the original text, and based on the probability value being smaller than the first threshold value, identifying a second encoding vector having the highest similarity value indicating similarity to the first encoding vector among encoding vectors included in the learning data, and transmitting the identified second encoding vector to the external device.

In the above, a method of controlling the electronic device 100, and a computer readable recording medium including a program executing the method of controlling the electronic device 100 were described briefly, but this is only for omitting overlapping explanation, and one or more embodiments regarding the electronic device 100 may be applied to a method of controlling the electronic device 100, and a computer readable recording medium including a program executing the method of controlling the electronic device 100.

Also, according to one or more of the aforementioned embodiments of the disclosure, the electronic device 100 can improve both the efficiency of an operation and the quality of a translation text by using only an encoding vector acquired through an encoder without acquiring a translation text using a decoder.

Specifically, the electronic device 100 can noticeably improve the operation speed and the efficiency in utilizing a hardware resource by using only an encoding vector acquired through an encoder in acquiring a translation text, without an operation through a decoder.

Also, according to the disclosure, in a case where the probability that an encoding vector acquired through an encoder would correspond to an abnormal translation is high, an encoding vector similar to the encoding vector having a high probability to correspond to an abnormal translation among the encoding vectors stored in the learning data is used in acquiring a translation, and accordingly, the quality of a translation text can be improved.

In addition, according to the disclosure, whether a translation is normal is identified based on an encoding vector that can include information on more attributes than a text itself without using a translation text, and thus there is an advantage that semantic analysis that goes beyond syntactic analysis is possible.

Further, according to the disclosure, in case it is identified that an encoding vector acquired through an encoder corresponds to a normal translation, a vector pair including the encoding vector is stored as learning data, and the encoder is retrained based on it, and accordingly, the quality of a translation text can further be improved.

Functions related to artificial intelligence according to the disclosure are operated through the processor 130 and the memory 120 of the electronic device 100.

The processor 130 may consist of one or a plurality of processors 130. Here, the one or plurality of processors 130 may include at least one of a central processing unit (CPU), a graphic processing unit (GPU), or a neural processing unit (NPU), but the processors are not limited to the aforementioned examples of processors 130.

A CPU is a generic-purpose processor 130 that can perform not only general operations but also artificial intelligence operations, and it can effectively execute a complex program through a multilayer cache structure. A CPU is advantageous for a serial processing method that enables a systemic linking between the previous calculation result and the next calculation result through sequential calculations. Meanwhile, the generic-purpose processor 130 is not limited to the aforementioned examples excluding cases wherein it is specified as the aforementioned CPU.

A GPU is a processor 130 for mass operations such as a floating point operation used for graphic processing, etc., and it can perform mass operations in parallel by massively integrating cores. In particular, a GPU may be advantageous for a parallel processing method such as a convolution operation, etc. compared to a CPU. Also, a GPU may be used as a co-processor 130 for supplementing the function of a CPU. Meanwhile, a processor 130 for mass operations is not limited to the aforementioned examples excluding cases wherein it is specified as the aforementioned GPU.

An NPU is a processor 130 specialized for an artificial intelligence operation using an artificial neural network, and it can implement each layer constituting an artificial neural network as hardware (e.g., silicon). Here, the NPU is designed to be specialized according to the required specification of a company, and thus it has a lower degree of freedom compared to a CPU or a GPU, but it can effectively process an artificial intelligence operation required by the company. Meanwhile, as the processor 130 specialized for an artificial intelligence operation, an NPU may be implemented in various forms such as a tensor processing unit (TPU), an intelligence processing unit (IPU), a vision processing unit (VPU), etc. Meanwhile, the artificial intelligence processor 130 is not limited to the aforementioned examples excluding cases wherein it is specified as the aforementioned NPU.

Also, the one or plurality of processors 130 may be implemented as a system on chip (SoC). Here, in the SoC, the memory 120, and a network interface such as a bus for data communication between the processor 130 and the memory 120, etc. may be further included other than the one or plurality of processors 130.

In case the plurality of processors 130 are included in the system on chip (SoC) included in the electronic device 100, the electronic apparatus 100 may perform an operation related to artificial intelligence (e.g., an operation related to learning or inference of the artificial intelligence model) by using some processors 130 among the plurality of processors 130. For example, the electronic device 100 may perform an operation related to artificial intelligence by using at least one of a GPU, an NPU, a VPU, a TPU, or a hardware accelerator specified for artificial intelligence operations such as a convolution operation, a matrix product operation, etc. among the plurality of processors 130. However, this is merely an example, and the electronic device 100 may process an operation related to artificial intelligence by using the generic-purpose processor 130 such as a CPU, etc.

Also, the electronic device 100 may perform operations related to artificial intelligence by using a multicore (e.g., a dual core, a quad core, etc.) included in one processor 130. In particular, the electronic device 100 may perform artificial intelligence operations such as a convolution operation, a matrix product operation, etc. in parallel by using the multicore included in the processor 130.

The one or plurality of processors 130 perform control to process input data according to predefined operation rules or an artificial intelligence model stored in the memory 120. The predefined operation rules or the artificial intelligence model are characterized in that they are made through learning.

Here, being made through learning means that a learning algorithm is applied to a plurality of learning data, and predefined operation rules or an artificial intelligence model having desired characteristics are thereby made. Such learning may be performed in a device itself wherein artificial intelligence is performed according to the disclosure, or performed through a separate server/system.

The artificial intelligence model may consist of a plurality of neural network layers. Each layer has at least one weight value, and performs an operation of the layer through the operation result of the previous layer and at least one defined operation. As examples of a neural network, there are a convolutional neural network (CNN), a deep neural network (DNN), a recurrent neural network (RNN), a restricted Boltzmann Machine (RBM), a deep belief network (DBN), a bidirectional recurrent deep neural network (BRDNN) and deep Q-networks, and a Transformer, but the neural network in the disclosure is not limited to the aforementioned examples excluding specified cases.

A learning algorithm is a method of training a specific subject device (e.g., a robot) by using a plurality of learning data and thereby making the specific subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

According to an embodiment, a storage medium that is readable by machines may be provided in the form of a non-transitory storage medium. Here, the term "non-transitory" only means that a storage medium is a tangible device, and does not include signals (e.g., electromagnetic waves), and the term does not distinguish a case wherein data is stored in the storage medium semi-permanently and a case wherein data is stored in the storage medium temporarily. For example, "a non-transitory storage medium" may include a buffer wherein data is temporarily stored.

Also, according to one or more embodiments of the disclosure, methods according to one or more embodiments disclosed herein may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed directly on-line (e.g., download or upload) through an application store (e.g., Play Store™), or between two user devices (e.g., smartphones). In the case of on-line distribution, at least a portion of a computer program product (e.g., a downloadable app) may be stored in a storage medium readable by machines such as the server of the manufacturer, the server of the application store, and the memory 120 of the relay server at least temporarily, or may be generated temporarily.

In addition, each of the components (e.g., a module or a program) according to the aforementioned embodiments of the disclosure may consist of a singular object or a plurality of objects. Also, among the aforementioned corresponding sub components, some sub components may be omitted, or other sub components may be further included in one or more embodiments. Alternatively or additionally, some components (e.g., a module or a program) may be integrated as an object, and perform functions that were performed by each of the components before integration identically or in a similar manner.

Further, operations performed by a module, a program, or other components according to one or more embodiments may be executed sequentially, in parallel, repetitively, or heuristically. Or, at least some of the operations may be executed in a different order or omitted, or other operations may be added.

Meanwhile, the term "a part" or "a module" used in the disclosure may include a unit implemented as hardware, software, or firmware, and may be interchangeably used with, for example, terms such as a logic, a logical block, a component, or a circuit. In addition, "a part" or "a module" may be a component constituted as an integrated body or a minimum unit or a part thereof performing one or more functions. For example, a module may be constituted as an application-specific integrated circuit (ASIC).

Also, one or more embodiments of the disclosure may be implemented as software including instructions stored in machine-readable storage media, which can be read by machines (e.g., computers). The machines refer to devices that call instructions stored in a storage medium, and can operate according to the called instructions, and the devices may include an electronic device according to the aforementioned embodiments (e.g., the electronic device 100).

In case an instruction is executed by a processor, the processor may perform a function corresponding to the instruction by itself, or by using other components under its control. An instruction may include a code that is generated or executed by a compiler or an interpreter.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic device comprising:

a communicator;

at least one memory storing at least one instruction and storing learning data comprising a plurality of encoding vectors; and at least one processor configured to access the at least one memory and to execute the at least one instruction, wherein the at least one instruction, when executed by the at least one processor, causes the electronic device to:

based on acquiring information on an original text of a first language, input the information on the original text into a first encoder and a second encoder, acquire as an output of the first encoder a third encoding vector comprising information for acquiring a translation text corresponding to the original text, and acquire as an output of the second encoder a first encoding vector comprising semantic information included in the original text and semantic information included in the third encoding vector, input the first encoding vector into a discriminator and acquire as an output of the discriminator a probability value indicating a probability that the first encoding vector corresponds to a normal translation, based on the probability value being greater than or equal to a predetermined first threshold value, control the communicator to transmit the first encoding vector to an external device comprising a decoder configured to acquire a translation text of a second language corresponding to the original text, based on the probability value being smaller than the predetermined first threshold value, acquire a similarity value for each of the plurality of encoding vectors, wherein each similarity value indicates a degree of similarity between a respective encoding vector of the plurality of encoding vectors and the first encoding vector, identify a second encoding vector among the plurality of encoding vectors having the highest similarity value, and control the communicator to transmit the identified second encoding vector to the external device, store the third encoding vector and the first encoding vector in the at least one memory as part of the learning data, train the second encoder based on the learning data which includes the third encoding vector and the first encoding vector, and repeat the foregoing operations on a second original text using the first encoder and the trained second encoder.

2. The electronic device of claim 1, wherein the at least one instruction, when executed by the at least one processor, further causes the electronic device to:

based on the probability value being smaller than the predetermined first threshold value, acquire a second similarity value for each of the plurality of encoding vectors, wherein each second similarity value indicates a degree of similarity between a respective encoding vector of the plurality of encoding vectors and the third encoding vector, and identify a vector pair comprising the second encoding vector and a fourth encoding vector from among the plurality of encoding vectors, wherein the fourth encoding vector has the highest second similarity value.

3. The electronic device of claim 1, wherein the at least one instruction, when executed by the at least one processor, further causes the electronic device to:

control the communicator to transmit the third encoding vector to a server comprising an external encoder, and acquire the first encoding vector by receiving, from the external device through the communicator, an encoding vector acquired by the external encoder that comprises semantic information included in the third encoding vector.

4. The electronic device of claim 1, wherein the at least one instruction, when executed by the at least one processor, further causes the electronic device to:

based on the probability value being smaller than the predetermined first threshold value and greater than or equal to a second threshold value smaller than the predetermined first threshold value, control the communicator to transmit the first encoding vector and the second encoding vector to the external device.

5. The electronic device of claim 1, wherein the at least one instruction, when executed by the at least one processor, further causes the electronic device to:

receive, from the external device through the communicator, feedback information comprising a user's feedback for a translation text acquired by the external device based on the first encoding vector or the second encoding vector, and based on identifying the feedback information as being positive, store a pair of vectors including the first encoding vector or the second encoding vector in the at least one memory as part of the learning data.

6. The electronic device of claim 1, wherein the third encoding vector comprises information on features of the first language and information on features of the second language, and wherein the first encoding vector comprises the semantic information and the information on the features of the second language.

7. A method of controlling an electronic device, the method comprising:

based on acquiring information on an original text of a first language, inputting the information on the original text into a first encoder and a second encoder, acquiring as an output of the first encoder a third encoding vector comprising information for acquiring a translation text corresponding to the original text, and acquiring as an output of the second encoder a first encoding vector comprising semantic information included in the original text and semantic information included in the third encoding vector;

inputting the first encoding vector into a discriminator and acquiring as an output of the discriminator a probability value indicating a probability that the first encoding vector corresponds to a normal translation;

based on the probability value being greater than or equal to a predetermined first threshold value, transmitting the first encoding vector to an external device comprising a decoder configured to acquire a translation text of a second language corresponding to the original text;

based on the probability value being smaller than the predetermined first threshold value, acquiring a similarity value for each of a plurality of encoding vectors, wherein each similarity value indicates a degree of similarity between a respective encoding vector of the plurality of encoding vectors and the first encoding vector, identifying a second encoding vector among the plurality of encoding vectors having the highest similarity value, and transmitting the identified second encoding vector to the external device;

storing the third encoding vector and the first encoding vector in at least one memory of the electronic device as part of learning data;

training the second encoder based on the learning data which includes the third encoding vector and the first encoding vector; and repeating the foregoing operations on a second original text using the first encoder and the trained second encoder.

8. The method of claim 7, further comprising:

based on the probability value being smaller than the predetermined first threshold value, acquiring a second similarity value for each of the plurality of encoding vectors, wherein each second similarity value indicates a degree of similarity between a respective encoding vector of the plurality of encoding vectors and the third encoding vector, and identifying a vector pair comprising the second encoding vector and a fourth encoding vector from among the plurality of encoding vectors, wherein the fourth encoding vector has the highest second similarity value.

9. The method of claim 7, wherein the acquiring the first encoding vector further comprises:

transmitting the third encoding vector to a server comprising an external encoder; and acquiring the first encoding vector by receiving, from the external device, an encoding vector acquired by the external encoder that comprises semantic information included in the third encoding vector.

10. The method of claim 7, further comprising:

based on the probability value being smaller than the predetermined first threshold value and greater than or equal to a second threshold value smaller than the predetermined first threshold value, transmitting the first encoding vector and the second encoding vector to the external device.

11. The method of claim 7, further comprising:

receiving, from the external device, feedback information comprising a user's feedback for a translation text acquired by the external device based on the first encoding vector or the second encoding vector; and based on identifying the feedback information as being positive, storing a pair of vectors including the first encoding vector or the second encoding vector in at least one memory of the electronic device as the learning data.

* * * * *